No. 12,273. REISSUED OCT. 11, 1904.

T. H. McQUOWN.

ELECTRIC CIRCUIT CLOSER AND BREAKER.

APPLICATION FILED JULY 7, 1904.

Witnesses:
Fred. L. Gunthof.
Warren B. Owen.

Inventor.
Thomas H. McQuown,
by Crosby Gregory
Attys.

No. 12,273. Reissued October 11, 1904.

UNITED STATES PATENT OFFICE.

THOMAS H. McQUOWN, OF BIGGSVILLE, ILLINOIS.

ELECTRIC-CIRCUIT CLOSER AND BREAKER.

SPECIFICATION forming part of Reissued Letters Patent No. 12,273, dated October 11, 1904.

Original application filed September 26, 1902, Serial No. 124,910. Patented January 19, 1904, No. 749,743. Divided and application for reissue filed July 7, 1904. Serial No. 215,692.

*To all whom it may concern:*

Be it known that I, THOMAS H. McQUOWN, a citizen of the United States, and a resident of Biggsville, in the county of Henderson and State of Illinois, have invented certain new and useful Improvements in Electric-Circuit Closers and Breakers, of which the following is a specification.

My invention relates to electric-circuit closers and breakers; and its object is to provide an electric-circuit closer and breaker simple and economical in construction and adapted to instantaneously close and break the circuit, so that the circuit will be closed for only an instant.

My invention comprises normally open contact-points included in an electric circuit and a movable part adapted to be operated either by hand or by some moving part of the machine to which the device is applied, said movable part during its movement operating on one of the contact-points, thereby to close said contact-points, together with means, preferably a spring, for independently moving and normally accelerating the motion of said movable part at a point in its travel where it has caused or is about causing said contact-points to connect, whereby the circuit is opened the instant that it is closed regardless of the rate of motion of the movable part.

My invention consists also in the novel mechanisms and combinations of parts hereinafter described, and particularly pointed out in the claims, which mechanisms and combinations form a practical embodiment of my invention.

Figure 1:
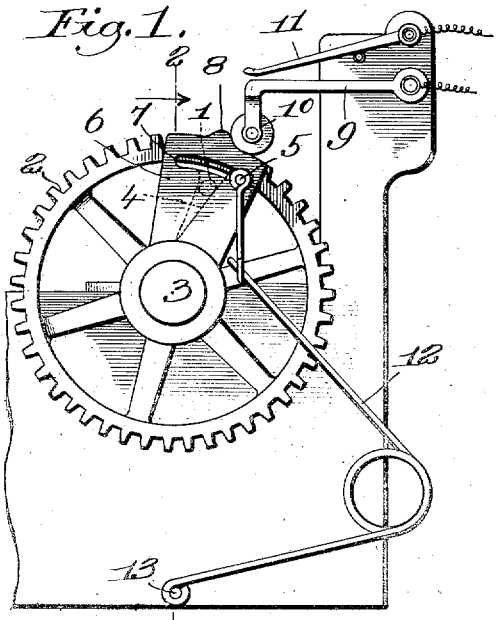
Figure 2:
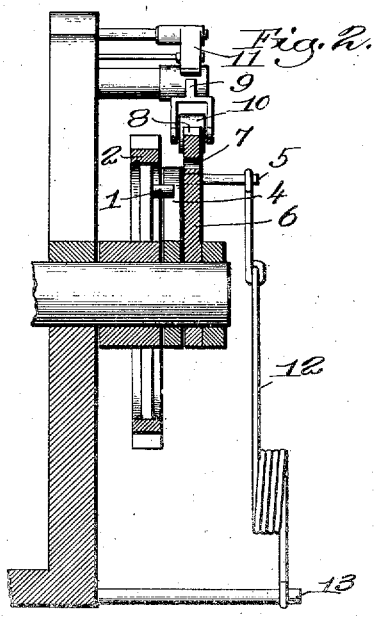
Figure 3:
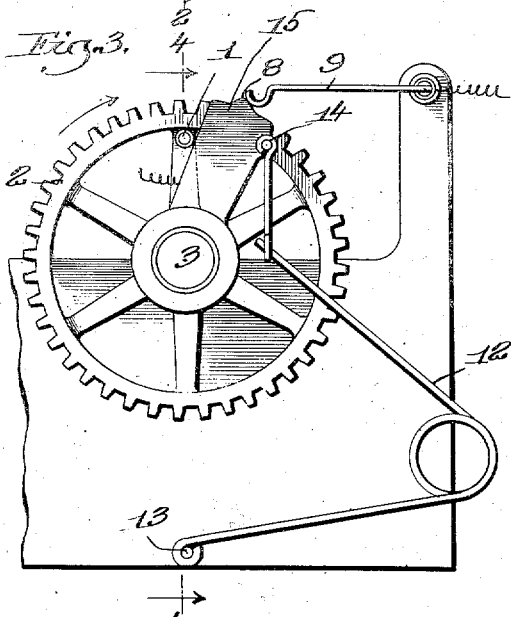
Figure 4:
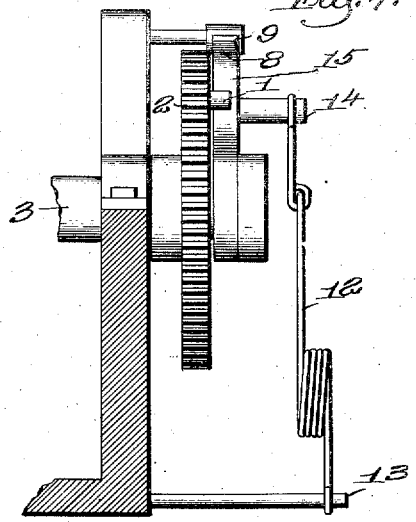

In the accompanying drawings, Figure 1 is a front view of my improved circuit closer and breaker. Fig. 2 is a vertical section of Fig. 1 on line 2 2, Fig. 1, looking in the direction of the arrow shown at said line 2 2. Fig. 3 is a front view of a simpler form of my improved circuit closer and breaker; and Fig. 4 is a vertical section of Fig. 3 on line 4 4 of Fig. 3 looking in the direction of the arrow shown at said line 4 4.

An apparatus embodying my invention includes normally open electric contacts forming part of an electric circuit and a movable part which at a point in its motion engages one of said contacts, thereby closing them together, and means independent from the mechanism for giving the movable part its motion, said means preferably being in the form of a spring for independently moving and accelerating the motion of the movable part at a point in its travel when it has just engaged or is about to engage one of said contacts, whereby said movable part passes out of engagement with said contact instantly and allows the contacts to open.

In the form of my invention shown in Figs. 1 and 2 the normally open contacts are designated by 9 and 11, respectively, and said contacts are closed by the movement of a rotatable part (shown as a plate 6) loosely mounted on a stud or pin 3. For giving motion to said plate 6 I have shown a projecting part or pin 1, carried by a crank or, as shown in the drawings, by a wheel 2, which for convenience I prefer to place on the stud or spindle 3. Said wheel 2 is rotated by some moving part of the machinery to which my circuit closer and breaker is applied, and the pin or part 1 is adapted to abut against the crank-like arm 4, (shown in Figs. 1 and 2,) loosely rotating on said stud or spindle, and thus rotate said arm. This crank-like arm 4 has a pin 5, which plays between two abutments on the rotatable plate 6, whereby the rotation of the arm 4 in either direction will operate to move said plate 6. These abutments are in the construction shown in Figs. 1 and 2 the ends of the slot-opening 7 in the plate 6, through which opening the pin 5 extends. This plate 6 has on its periphery a slight elevation or rib 8, which during the revolution of the plate 6 engages a suitable spring or lever-arm 9, which may be furnished, as shown in Figs. 1 and 2, with a friction-roller 10. The elevation 8 in the revolution of the plate 6 raises the lever-arm or spring 9, which forms one of the normally open electric contacts, until it makes electric contact with the other contact, 11, thereby to close the circuit. The breaking of the circuit the instant that it is closed is accomplished by means which is independent from the driving means for the plate 6, and therefore is not dependent for its action upon the speed of operation of said driving means. As herein shown, the pin 5 has attached thereto one end of a spring 12, the other end thereof being secured to any suitable fixed point, as at 13, and said spring being constructed so that it will pull downwardly on the pin 5.

The operation of the device will be more fully explained hereinafter.

The crank or wheel 2 in Figs. 1 and 2 may revolve in either direction and the operation will be the same.

A simpler form of my invention adapted to the revolution of the crank or wheel 2 in but one direction is shown in Figs. 3 and 4, the crank-like arm 4 being omitted, the plate 15 rotatable on the spindle 3 and having no slot, and the spring 12 being attached to the pin 14 on the plate 15, as will be readily understood by referring to Figs. 3 and 4.

It is obvious that in any embodiment of my invention the normally open contact-points and electrical connections may be arranged in various ways. For instance, the connections may be with the lever or spring 9 and the contact-spring 11, they forming normally open contact-points, as shown in Figs. 1 and 2, or the connections may be with the plate 15 and the contact-spring 9, they forming normally open contact-points, as shown in Figs. 3 and 4, suitable insulation being provided in any case.

It will be understood that whether the rotation of the plate 6 or the plate 15 is fast or slow the electric connection is always broken instantly it is closed, because as soon as the plate 6 or the plate 15 is rotated far enough for the pin 5 in Figs. 1 and 2 or the pin 14 in Figs. 3 and 4 to pass its dead-center—that is, to pass a line produced upward from the fixed point 13 of the spring 12 through the center of the spindle 3—the spring 12 instantly acts on the plate 6 or the plate 15, accelerating its motion and rotating it forward, so that the projection 8 is by the action of the spring forced into contact with the lever-arm or spring 9 and instantly out of contact therewith, whereby the circuit is by the force of the spring 12 broken instantly it is closed.

My invention is especially adapted to be used in connection with any machine wherein a certain function is performed by the closing and opening of an electric circuit. One example of a machine of this type is shown in my Patent No. 749,743, dated January 19, 1904, wherein is illustrated a speed-indicator adapted to indicate the speed of rotation of any shaft, as the propelling-shaft of a vessel or the driving-shaft of a locomotive, vehicle, &c., each rotation of said shaft being made to make and instantly break an electric circuit, thereby to advance the speed-indicator one step. Where the machine is to be applied in this way, the wheel 2, which, it will be noted, is a gear-wheel, may be rotated by the shaft the speed of which it is desired to register, in which case each rotation of the shaft would cause the electric circuit to be made and instantly broken.

My invention may also be applied to such machines as internal-combustion engines, where the explosive charge is exploded by the making or breaking of an electric current, and when thus applied the wheel 2 will be connected to and rotated by some rotating part of the engine—as, for instance, the crank-shaft.

The invention, however, is capable of use in many other ways than those suggested and with a great number of machines in which a certain function is performed by the making or breaking of an electric circuit.

This invention is divided out from my application, Serial No. 124,910, filed September 26, 1902, on which application Patent No. 749,743, dated January 19, 1904, was issued.

Both forms of the invention above shown include normally separate contact-points, a movable contact-operating member adapted at a point in its movement to operate on one of the contact-points, thereby to close said contacts, driving means for the contact-operating member, and means independent from said driving mechanism to accelerate the motion of said contact-operating member at the point in its movement where it operates on said contact-point, whereby the contact is broken the instant that it is made regardless of the speed of operation of the driving mechanism.

It is obvious that my invention may be embodied in modified and varying mechanisms, and I do not limit myself to the hereinbefore-described mechanism as the only embodiment thereof.

Having described my invention, what I claim as new, and desire to secure by Letters Patent, is—

1. In an electric-circuit closer and breaker, normally separated contact-points, a movable contact-closing member adapted at a point in its movement to operate on one of said contact-points thereby to close said points, driving mechanism for the contact-closing member, and means independent from said driving mechanism to accelerate the motion of the contact-closing member at the point in its movement where it operates on said contact-point, whereby the circuit is opened the instant that it is closed regardless of the speed of the driving mechanism.

2. In an electric-circuit closer and breaker, normally separated contact-points, a rotatable member adapted at a point in its rotation to operate on one of said points thereby to close them together, driving mechanism for said rotatable member, and means independent from said driving mechanism to accelerate the motion of said rotatable member at the point in its rotation where it operates on one of the contact-points.

3. In an electric-circuit closer and breaker, normally separated contact-points, a rotatable member adapted at a point in its rotation to operate on one of said points thereby to close them together, driving mechanism for said rotatable member, and means independent from said driving mechanism to accelerate the motion of said rotatable member at a point in its rotation just prior to that at which it operates on the contact-points and while it is so operating.

4. In an electric-circuit closer and breaker, electric contact-points, a driving part continuously rotatable on an axis, a second part to connect and separate by its motion the contact-points and continuously rotatable loosely on the same axis, a striker on the first part adapted to engage the second part and rotate it with the rotation of the first part, and independent means for accelerating the rotation of the second part at a point in its circuit where it causes the contact-points to connect and separate.

5. In an electric-circuit closer and breaker, electric contact-points, a driving part continuously rotatable on an axis, a second part to connect and separate by its motion the contact-points and continuously rotatable loosely on the same axis, a striker on the first part adapted to engage the second part and rotate it with the rotation of the first part, and a spring for accelerating the rotation of the second part at a point in its circuit where it causes the contact-points to connect and separate.

6. In an electric-circuit closer and breaker, electric contact-points, a driving part rotatable on an axis in either direction, a second part loosely rotatable in either direction on the same axis, a striker on the first part adapted to engage the second part and rotate it with the rotation of the first part, a third part to connect and separate the contact-points and loosely rotatable in either direction on the same axis, two abutments on the third part between which is adapted to move a striker on the second part, said striker on the second part adapted to move between said abutments and by engaging with either to rotate the third part with the rotation of the second part, and independent means for accelerating the rotation of the third part at a point in its circuit where it causes the contact-points to connect and separate.

7. In an electric-circuit closer and breaker, electric contact-points, a driving part rotatable on an axis in either direction, a second part loosely rotatable in either direction on the same axis, a striker on the first part adapted to engage the second part and rotate it with the rotation of the first part, a third part to connect and separate the contact-points and loosely rotatable in either direction on the same axis, two abutments on the third part between which is adapted to move a striker on the second part, said striker on the second part adapted to move between said abutments and by engaging with either to rotate the third part with the rotation of the second part, and a spring for accelerating the rotation of the third part at a point in its circuit where it causes the contact-points to connect and separate.

In testimony whereof I have signed my name to this specification in the presence of two subscribing witnesses.

THOMAS H. McQUOWN.

Witnesses:
LOUIS C. SMITH,
EMILY C. HODGES.